United States Patent [19]

Itai

[11] Patent Number: 4,899,250
[45] Date of Patent: Feb. 6, 1990

[54] GAS INSULATED SWITCHGEAR WITH CIRCUIT BREAKERS PERPENDICULAR TO MAIN BUSES

[75] Inventor: Kosaku Itai, Amagasaki, Japan

[73] Assignee: Mitsubishi Denki Kabushiki Kaisha, Tokyo, Japan

[21] Appl. No.: 257,759

[22] Filed: Oct. 14, 1988

[30] Foreign Application Priority Data

Oct. 26, 1987 [JP] Japan ................. 62-271169

[51] Int. Cl.⁴ .............................. H02B 1/20
[52] U.S. Cl. ................. 361/341; 200/148 R; 361/376
[58] Field of Search ........... 307/147, 148; 361/331, 361/333, 335, 341, 376, 378; 200/50 AA, 50 C, 48 R, 148 R, 148 B

[56] References Cited

FOREIGN PATENT DOCUMENTS 0190551 8/1986 European Pat. Off. ............ 361/341
139612 8/1983 Japan .
166212 11/1983 Japan .
141606 9/1985 Japan .

*Primary Examiner*—Gerald P. Tolin
*Attorney, Agent, or Firm*—Oblon, Spivak, McClelland, Maier & Neustadt

[57] ABSTRACT

In one-and-a half system gas insulated switchgear, three circuit breakers (3, 4, 5) are parallelly aligned between a pair of main buses (1, 2) with a right angle thereto and connected in series with each other between the main buses.

5 Claims, 7 Drawing Sheets

GAS INSULATED SWITCHGEAR WITH CIRCUIT BREAKERS PERPENDICULAR TO MAIN BUSES

FIELD OF THE INVENTION AND RELATED ART STATEMENT

1. Field of the Invention

The present invention relates to a gas insulated switchgear, and more particularly relates to miniaturization of the gas insulated switchgear.

2. Description of the Related Art

FIG. 7 is a skeleton diagram of the conventional one-and-a half system gas insulated switchgear. FIG. 8 is a plane view of the gas insulated switchgear embodying a part "IV" of the skeleton diagram of FIG. 7 with three lines, and FIG. 9 is a cross-sectional view of FIG. 8. In this one-and-a half system, double main buses and three circuit breakers (per one phase circuit) are provided. A first circuit breaker 3 is connected with the first main bus 1 through a disconnecting switch 6, and a third circuit breaker 5 is connected with the second main bus 2 through a disconnecting switch 11. Further, the first circuit breaker 3 is connected with a second circuit breaker 4 through two disconnecting switches 7 and 8, and the second circuit breaker 4 is connected with the third circuit breaker 5 through two disconnecting switches 9 and 10. In this conventional system, the first main bus 1 and the second main bus 2 are disposed in parallel with each other, and three circuit breakers 3, 4 and 5 are aligned in a straight line. A feeder connection part 22 is provided between two disconnecting switches 7 and 8, and also a feeder connection part 23 is provided between two disconnecting switches 9 and 10. From these feeder connection parts 22 and 23, branch buses 17A and 16A are led to bushings 14 and 15 through disconnecting switches 12 and 13, respectively.

In the above-mentioned conventional gas insulated switchgear, three circuit breakers 3, 4 and 5 are aligned in a straight line, and the bushings 14 and 15 are disposed between adjacent two phase circuits of the gas insulated switchgear. Therefore, the conventional gas insulated switchgear has a problem of a requiring a large installation area.

OBJECT AND SUMMARY OF THE INVENTION

The object of the present invention is to offer a gas insulated switchgear which can be installed within smaller installation area than the conventional one.

In order to achieve the above-mentioned object, a gas insulated switchgear in accordance with the present invention comprises:

a pair of main buses which are disposed in substantial parallelism with each other;

a plurality of circuit breakers which are parallelly aligned in a space defined between the main buses with a substantial right angle to the main buses, the circuit breakers being connected in series with each other between the main buses; and a plurality of connection buses for connecting adjacent two of the circuit breakers, each of the connection buses being to be connected to a feeder.

According to the above-mentioned construction, an interval between both main buses is drastically decreased.

DESCRIPTION OF THE PREFERRED EMBODIMENT

Figure 1:
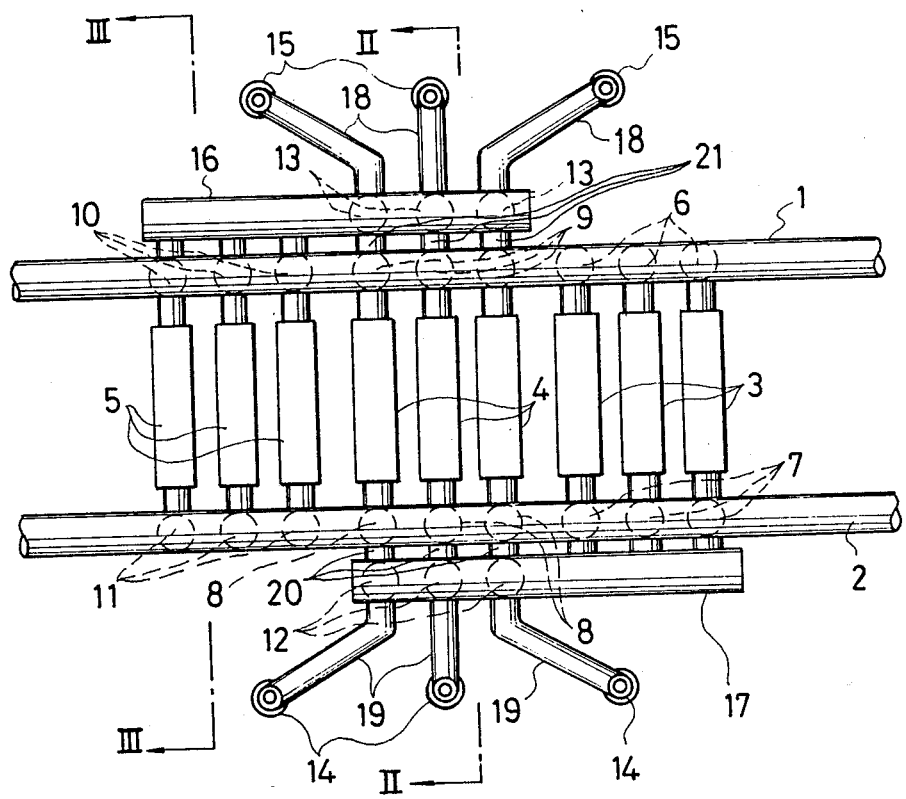
FIG. 1 is a plane view showing a gas insulated switchgear of an embodiment of the present invention.
Figure 2:
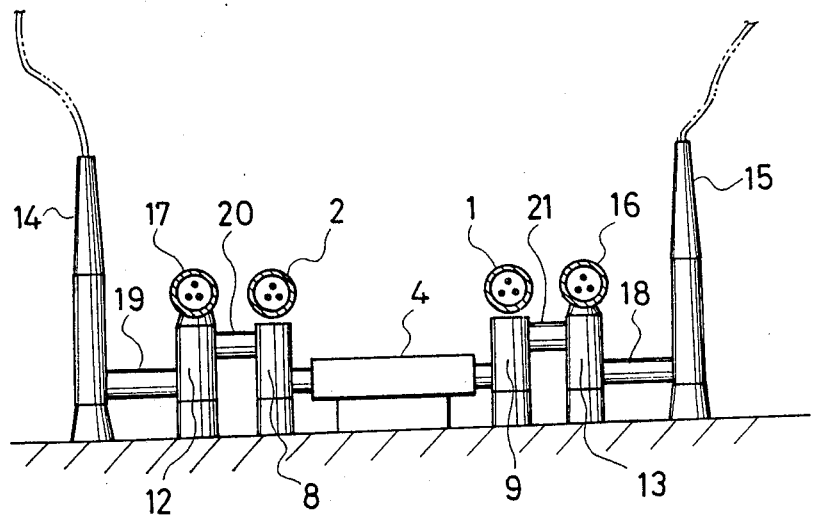
FIG. 2 is a cross-sectional view taken on line II—II of FIG. 1.
Figure 3:
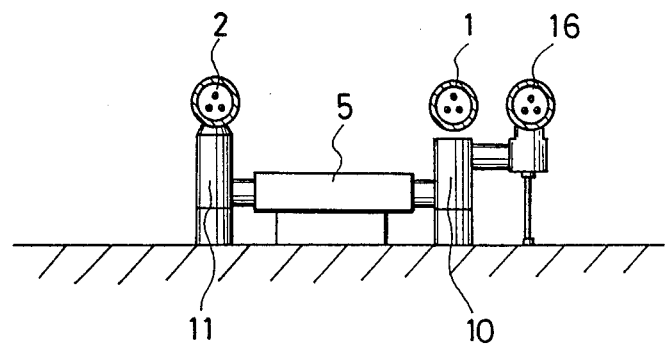
FIG. 3 is a cross-sectional view taken on line III—III of FIG. 1.
Figure 4:
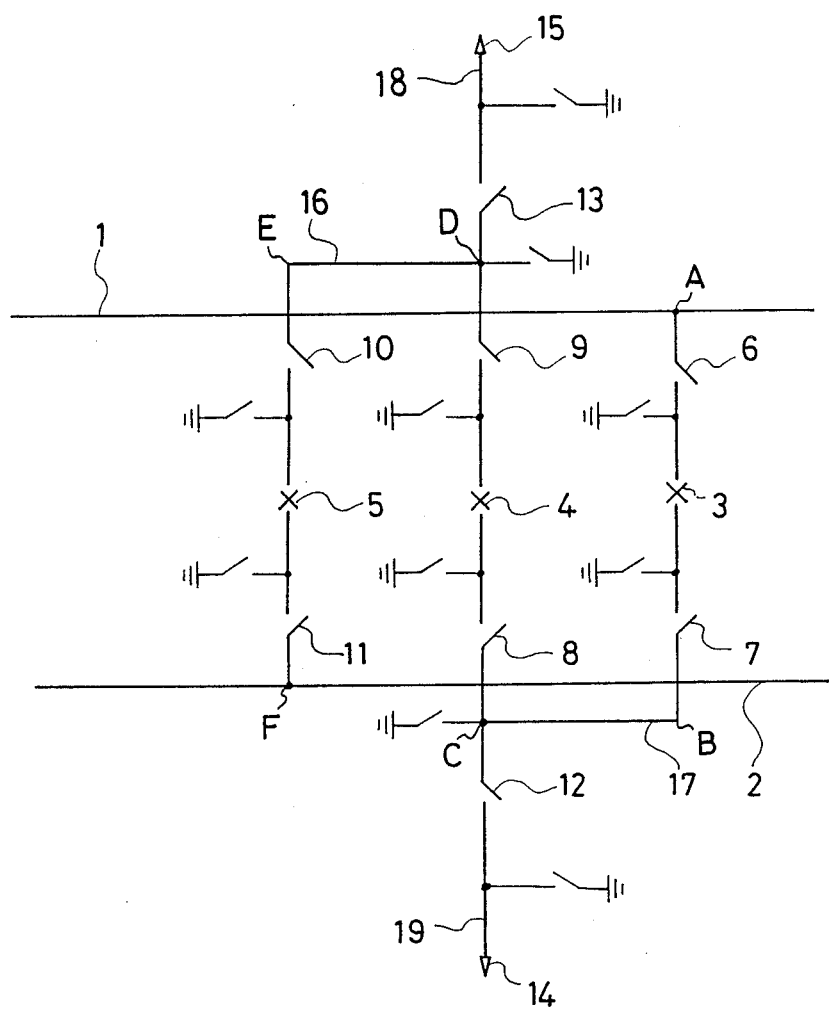
FIG. 4 is a skeleton diagram corresponding to FIG. 1.
Figure 7:
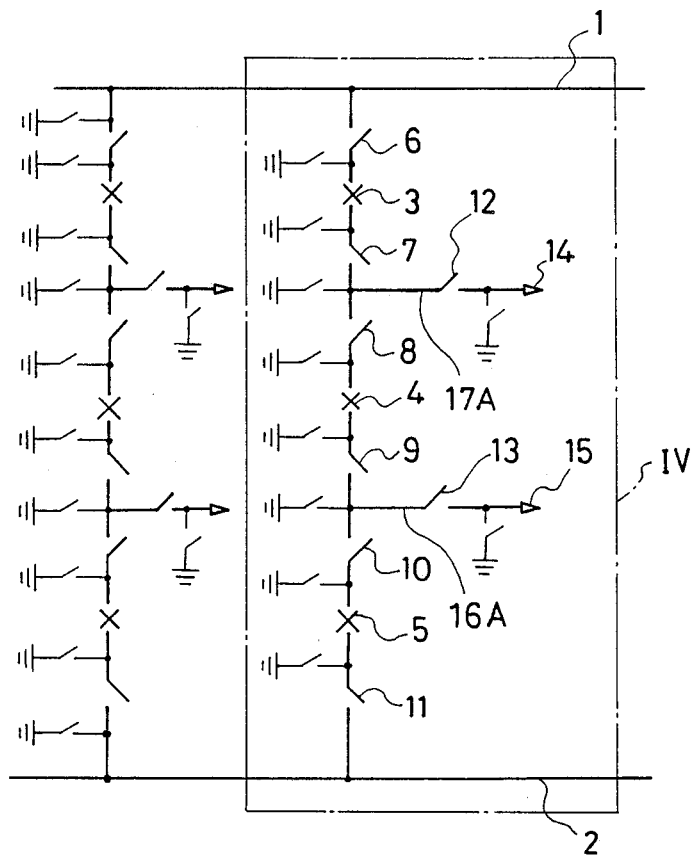
FIG. 7 is a common skeleton diagram of the present invention and the conventional gas insulated switchgear.

Hereafter, preferred embodiment of the present invention is described with reference to the accompanying drawings. FIG. 1 is a plane view showing a gas insulated switchgear. FIG. 2 and FIG. 3 are cross-sectional views taken on line II—II and III—III of FIG. 1, respectively. And, FIG. 4 is a skeleton diagram which is corresponding to "IV" of FIG. 7. This gas insulated switchgear is of one-and-a half system wherein double main buses and three circuit breakers (per one phase circuit) are provided. In FIG. 4, a first circuit breaker 3 is connected to a first main bus 1 through a disconnecting switch 6, and a third circuit breaker 5 is connected to a second main bus 2 through a disconnecting switch 11. Further, the first circuit breaker 3 is connected a second circuit breaker 4 through two disconnecting switches 7 and 8, and the second circuit breaker 4 is connected to the third circuit breaker 5 through two disconnecting switches 9 and 10. Thus, a circuit between two main buses 1 and 2 is substantially arranged in S-shaped or reverse-S-shaped configuration, which is shown by points A, B, C, D, E and F. Next, in FIG. 1, the first main bus 1 and the second main bus 2 are disposed in parallel with each other. The first, second and third circuit breakers 3, 4 and 5, which are in parallel with each other, are aligned with a substantial right angle to the first and second main buses 1 and 2. An end of the first circuit breaker 3 is connected to the first main bus 1 through the disconnecting switch 6 which is disposed above an extended axial centerline of the first circuit breaker 3. The other end of the first circuit breaker 3 is connected to a connection bus 17 through the disconnecting switch 7. Both ends of the second circuit breaker 4 are connected to the connection bus 17 and a connection bus 16 through the disconnecting switches 8 and 9, respectively. Both connection buses 16 and 17 are disposed in parallel with and outside the main buses 1 and 2 across the circuit breakers 3, 4 and 5. A connection part 20 for feeder is provided between the disconnecting switches 8 and 12, and a connection part 21 for feeder is provided between the disconnecting switches 9 and 13. The disconnecting switches 12 and 13 are connected to a pair of three phase bushings 14 and 15, which are to be connected to feeders, through branch buses 19 and 18, respectively. The bushings 14 and 15 are disposed in symmetrical manner to each other outside the connection buses 17 and 16 across the circuit breaker 4. An end of the third circuit breaker 5 is connected with the second main bus 2 through the disconnecting switch 11, which is disposed above an extended axial centerline of the third circuit breaker 5. The other end of the third circuit breaker 5 is connected to the connection bus 16 through the disconnecting switch 10. The first main bus 1 is disposed above the disconnecting switches 6, 9 and 10, and the second main bus 2 is disposed above the disconnecting switches 7, 8 and 11. Also, the connection buses 16 and 17 are disposed above the disconnecting switches 13 and 12, respectively.

Figure 8:
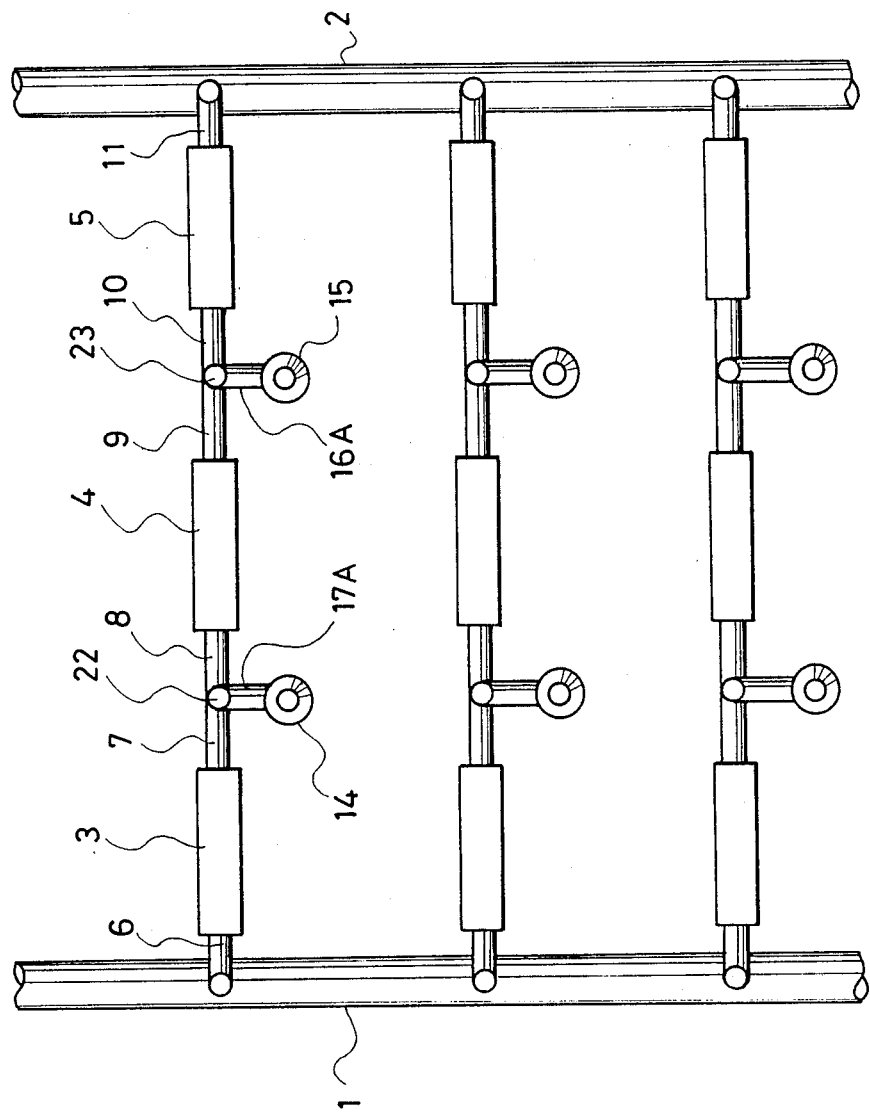
FIG. 8 is the plane view showing the conventional gas insulated switchgear.
Figure 9:
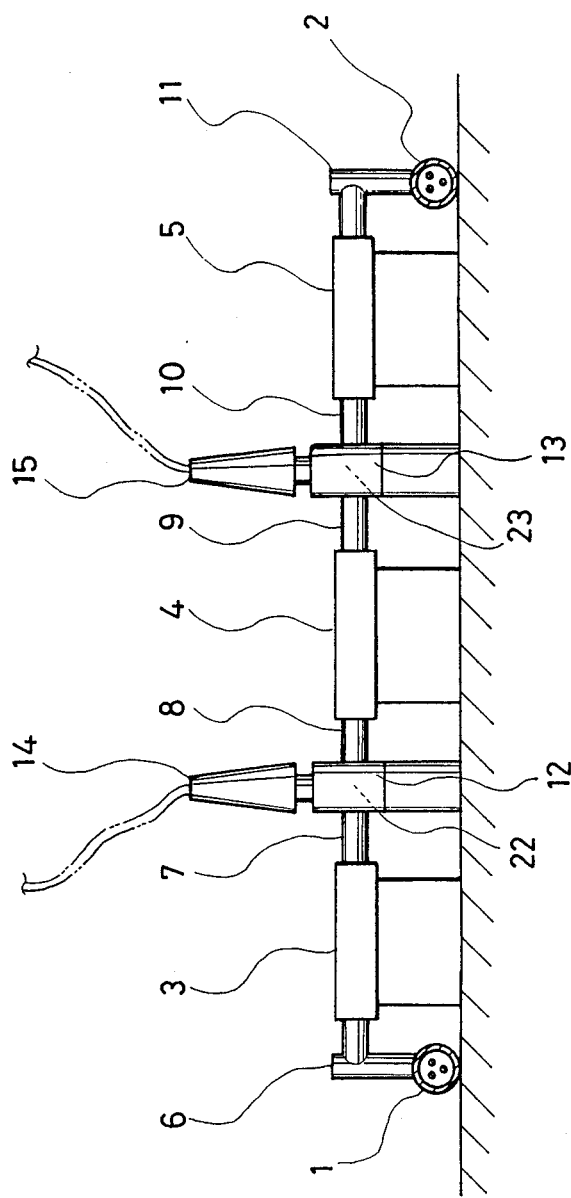
FIG. 9 is the cross-sectional view of FIG. 8.

According to the above-mentioned construction, all circuit breakers 3, 4 and 5 are parallelly aligned in a space defined between the main buses 1 and 2 with a right angle thereto, and the connection buses 16 and 17 are disposed outside the main buses 1 and 2. Therefore, interval between the first main bus 1 and the second main bus 2 can be made considerably smaller than that of the conventional gas circuit breaker as shown in FIG. 8.

Figure 5:
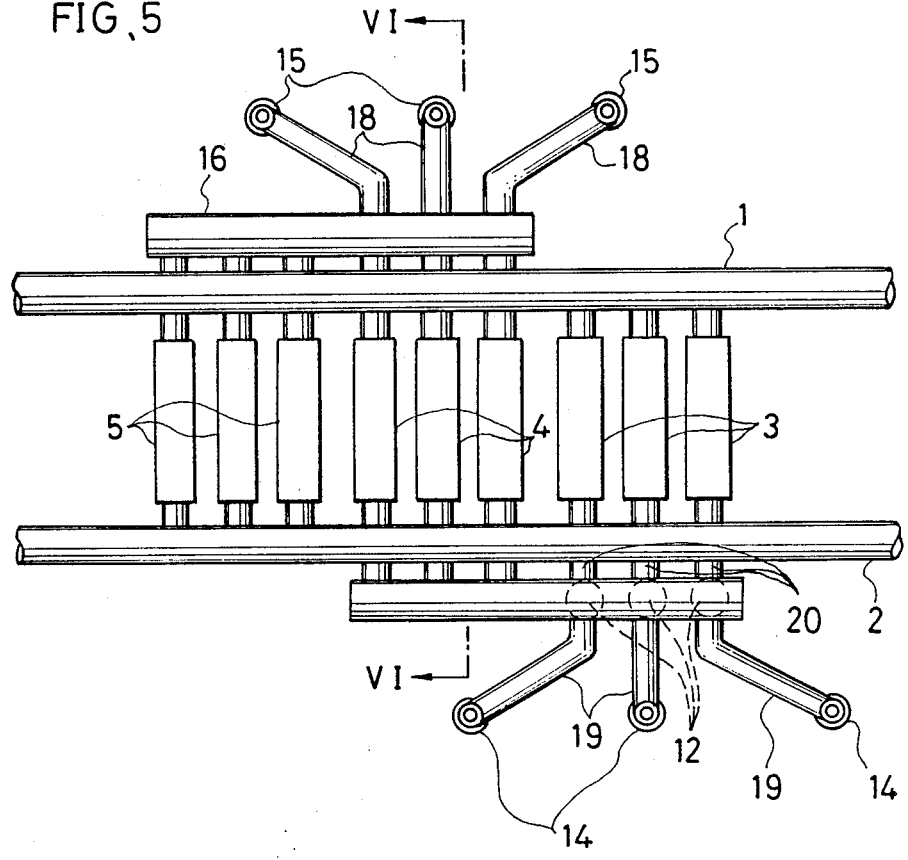
FIG. 5 is a plane view showing a gas insulated switchgear of another embodiment of the present invention.
Figure 6:
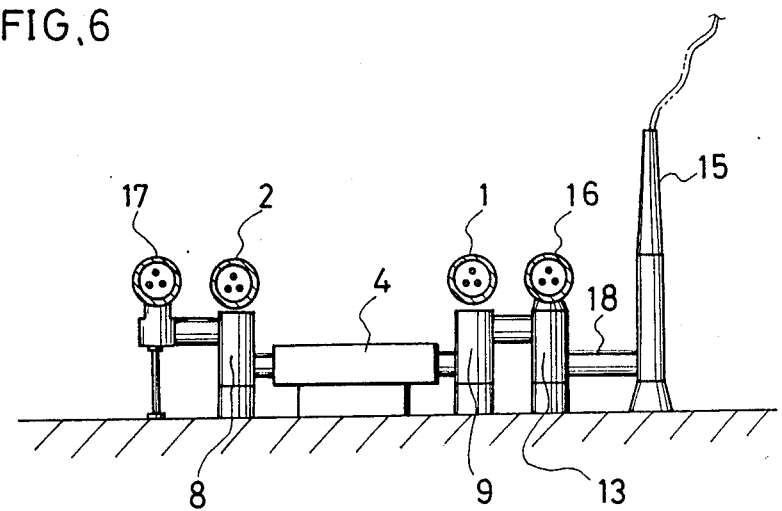
FIG. 6 is a cross-sectional view taken on line VI—VI of FIG. 5.

FIG. 5 is a plane view showing a gas insulated switchgear of another embodiment. FIG. 6 is a cross-sectional view taken on line VI-VI of FIG. 5. Differences between the aforementioned embodiment and this embodiment lie in that the connection part 20 for feeder and the disconnecting switch 12 are shifted in axial directions of the main buses 1 and 2 to dispose above the extended axial centerline of the circuit breaker 3. Corresponding parts and components are designated by the same or related numerals or marks to the foregoing example, and the same explanation applies.

In the above-mentioned second embodiment, three phase type buses are used. However, single phase type buses may be used. Further, the circuit breakers 3, 4 and 5 may be vertically aligned with a right angle to a plane containing the first and second main busses 1 and 2.

Although fairly the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A gas insulated switchgear comprising:
   a pair of main buses which are disposed in substantial parallelism with each other;
   a plurality of circuit breakers which are parallelly aligned in a spaced defined between said main buses with a substantial right angle to said main buses, said circuit breakers being electrically connected in series with each other between said main buses;
   a plurality of connection buses each electrically connecting an adjacent two of said circuit breakers, each of said connection buses being electrically connected to a feeder;
   a plurality of main disconnecting switches which are connected to said circuit breakers in series with each other between said main buses, said main disconnecting switches being disposed above extended axial centerlines of said circuit breakers at respective ends of said circuit breakers; and
   a plurality of feeder disconnecting switches connecting each of said connection buses to said feeder;
   wherein said connection buses connect an adjacent two of said circuit breakers through an adjacent two of said disconnecting switches; and
   wherein said main buses are disposed above said main disconnecting switches, and said connection buses are disposed above said feeder disconnecting switches.

2. A gas insulated switchgear in accordance with claim 1, wherein
   said connection buses are disposed in parallel with said main buses.

3. A gas insulated switchgear in accordance with claim 2, wherein
   said connection buses are disposed outside said main buses and shifted from each other.

4. A gas insualted switchgear in accordance with claim 1, further comprising
   a pair of three phase bushings which are led from said connection buses and disposed outside said connectin buses, said bushings being disposed in symmetrical manner to each other across one of said circuit breakers.

5. A gas insulated switchgear in accordance with claim 1, further comprising
   a pair of three phase bushings which are led froms said connection buses and disposed outside said connection buses, one of said bushings being shifted from the other one of said bushings in axial directions of said main buses.

* * * * *